US012533891B2

(12) United States Patent
Murata

(10) Patent No.: US 12,533,891 B2
(45) Date of Patent: Jan. 27, 2026

(54) PRINTER

(71) Applicant: Seiko Instruments Inc., Chiba (JP)

(72) Inventor: Tomohiro Murata, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 150 days.

(21) Appl. No.: 18/609,841

(22) Filed: Mar. 19, 2024

(65) Prior Publication Data

US 2024/0316951 A1 Sep. 26, 2024

(30) Foreign Application Priority Data

Mar. 22, 2023 (JP) ................................ 2023-044855

(51) Int. Cl.

*B41J 3/407* (2006.01)
*B65H 3/66* (2006.01)
*B65H 18/26* (2006.01)

(52) U.S. Cl.

CPC .............. *B41J 3/4075* (2013.01); *B65H 3/66* (2013.01); *B65H 18/26* (2013.01); *B65H 2553/82* (2013.01)

(58) Field of Classification Search

CPC ..... B41J 3/4075; B41J 2/32; B41J 2/33; B41J 2/315; B41J 2/325; B41J 29/38;

(Continued)

(56) References Cited

U.S. PATENT DOCUMENTS

2013/0138391 A1 5/2013 Jackson et al.
2014/0147186 A1* 5/2014 Uchino .................. B41J 3/4075 400/613

(Continued)

FOREIGN PATENT DOCUMENTS

JP 2001-018940 A 1/2001

OTHER PUBLICATIONS

European Search Report in Application No. 24165114.0 dated Jul. 16, 2024 (6 pages).

*Primary Examiner* — Kristal Feggins
(74) *Attorney, Agent, or Firm* — Crowell & Moring LLP

(57) ABSTRACT

A printer is configured to perform printing on a linerless label including a pressure-sensitive adhesive surface formed on a back surface of the linerless label. The printer includes: a casing including: a receiving portion configured to receive the linerless label before printing; and a delivery slot through which the printed linerless label is delivered; a printing unit including: a thermal head, which is arranged inside the casing, and is configured to perform printing on the linerless label; and a platen roller, which extends in a width direction of the linerless label, and is configured to convey the linerless label toward the delivery slot while sandwiching the linerless label between the platen roller and the thermal head; and a sensor configured to detect the linerless label located between the printing unit and the delivery slot. The casing includes a guide surface to be opposed to the pressure-sensitive adhesive surface of the linerless label that has passed through the printing unit. The guide surface includes: an upstream portion, which includes a plurality of upstream ribs formed upright at intervals in the width direction to extend along a conveying direction of the linerless label; a downstream portion, which is provided at a distance from the upstream portion on a downstream side in the conveying direction, and includes a plurality of downstream ribs formed upright at intervals in the width direction to extend along the conveying direction; and a midstream portion, which is provided at the same position as that of the sensor in the conveying direction, is located between the upstream portion and the downstream portion, and includes at least one midstream rib formed upright only on a center portion of the midstream portion in the width direction to extend along the conveying direction.

6 Claims, 5 Drawing Sheets

(58) Field of Classification Search
CPC ..... B41M 5/0052; B41M 5/0094; B65H 3/66; B65H 18/26; B65H 2553/82; B41F 16/00; B41F 16/0006
See application file for complete search history.

(56) References Cited

U.S. PATENT DOCUMENTS

2017/0072723 A1* 3/2017 Yamanaka ............... B41J 29/13
2023/0202218 A1* 6/2023 Inoue ................... B65H 19/126
347/218

* cited by examiner

PRINTER

RELATED APPLICATIONS

This application claims priority to Japanese Patent application No. JP2023-044855 filed on Mar. 22, 2023, the entire content of which is incorporated herein by reference.

BACKGROUND OF THE INVENTION

1. Field of the Invention

The present invention relates to a printer.

2. Description of the Related Art

Hitherto, there has been known a thermal printer that operates as follows. Under a state in which a recording sheet is sandwiched between a platen roller and a thermal head, the platen roller is rotated, and thus printing is performed by the thermal head on a print surface of the recording sheet while the recording sheet is conveyed. Incidentally, in order to reduce environmental loads and improve convenience, for labels such as POS labels on food and various display labels, a so-called linerless label is used as a recording sheet in some cases. The linerless label is a recording sheet without a liner configured to cover a pressure-sensitive adhesive surface formed opposite to a print surface of the recording sheet.

In a printer that performs printing on linerless labels, when the printed labels are continuously issued, the labels delivered from the printer may stick to unintended places such as an outer surface of the printer or a periphery of the printer, which may interfere with delivery of the labels. For this reason, some printers are provided with a sensor that detects the presence or absence of the label in a sheet passing portion between a cutting section that cuts the printed labels and a delivery slot, and the printers restrict printing of the labels under a state in which the cut labels are not delivered, thereby regulating continuous issuance of the labels.

In the printer provided with the sensor that detects the label, a space for arranging the sensor is provided in the sheet passing portion. Thus, the sheet passing portion is provided over a relatively long length inside the delivery slot. However, as the length of the sheet passing portion becomes longer, an inner surface of the sheet passing portion to be opposed to a pressure-sensitive adhesive surface of the label also becomes larger in a direction of conveying the label, and hence the pressure-sensitive adhesive surface of the label is liable to stick to the inner surface of the sheet passing portion. When the label sticks to the inner surface of the sheet passing portion, the label sometimes does not pass through a detection position of the sensor so that the sensor cannot detect the label accurately. Accordingly, it is desired to prevent the pressure-sensitive adhesive surface of the label from sticking to the inner surface of the sheet passing portion. As an example of the related art of this type, there is known a label printer having a configuration in which a non-adhesive sheet is bonded to a surface defining the delivery slot with which the pressure-sensitive adhesive surface of the label is brought into contact (see Japanese Patent Application Laid-open No. 2001-18940).

However, in the above-mentioned related art, a new component is used to prevent sticking of the pressure-sensitive adhesive surface of the label, and hence manufacturing cost may increase due to an increase in the number of components. Accordingly, there is still room for improvement in preventing sticking of the label inside the delivery slot.

One of objects of the present disclosure is to provide a printer capable of preventing sticking of a label inside a delivery slot.

SUMMARY OF THE INVENTION

According to one embodiment of the present invention, there is provided a printer configured to perform printing on a linerless label including a pressure-sensitive adhesive surface formed on a back surface of the linerless label. The printer includes a casing including: a receiving portion configured to receive the linerless label before printing; and a delivery slot through which the printed linerless label is delivered; a printing unit including a thermal head, which is arranged inside the casing and is configured to perform printing on the linerless label; and a platen roller, which extends in a width direction of the linerless label and is configured to convey the linerless label toward the delivery slot while sandwiching the linerless label between the platen roller and the thermal head; and a sensor configured to detect the linerless label located between the printing unit and the delivery slot. The casing includes a guide surface to be opposed to the pressure-sensitive adhesive surface of the linerless label that has passed through the printing unit. The guide surface includes an upstream portion, which includes a plurality of upstream ribs formed upright at intervals in the width direction to extend along a conveying direction of the linerless label; a downstream portion, which is provided at a distance from the upstream portion on a downstream side in the conveying direction, and includes a plurality of downstream ribs formed upright at intervals in the width direction to extend along the conveying direction; and a midstream portion, which is provided at the same position as that of the sensor in the conveying direction, is located between the upstream portion and the downstream portion, and includes at least one midstream rib formed upright only on a center portion of the midstream portion in the width direction to extend along the conveying direction.

In the above-mentioned printer according to the one embodiment of the present invention, wherein the center portion is provided in a region in the width direction inside both ends of a range in which the plurality of upstream ribs are formed and inside both ends of a range in which the plurality of downstream ribs are formed.

In the above-mentioned printer according to the one embodiment of the present invention, wherein an opening is formed in the midstream portion, and wherein the sensor detects the linerless label through the opening.

In the above-mentioned printer according to the one embodiment of the present invention, wherein the at least one midstream rib includes a pair of midstream ribs arranged on both sides in the width direction across the sensor.

In the above-mentioned printer according to the one embodiment of the present invention, wherein the downstream ribs are prevented from protruding from a tangent line of the midstream portion when seen from the width direction.

In the above-mentioned printer according to the one embodiment of the present invention, wherein the receiving portion receives the linerless label wound into a roll shape.

DETAILED DESCRIPTION OF THE PREFERRED EMBODIMENTS

Now, an embodiment of the present invention is described based on the drawings. In the following description, components having the same or similar function are denoted by the same reference symbols. In some cases, overlapping description of the components is omitted.

Figure 1:
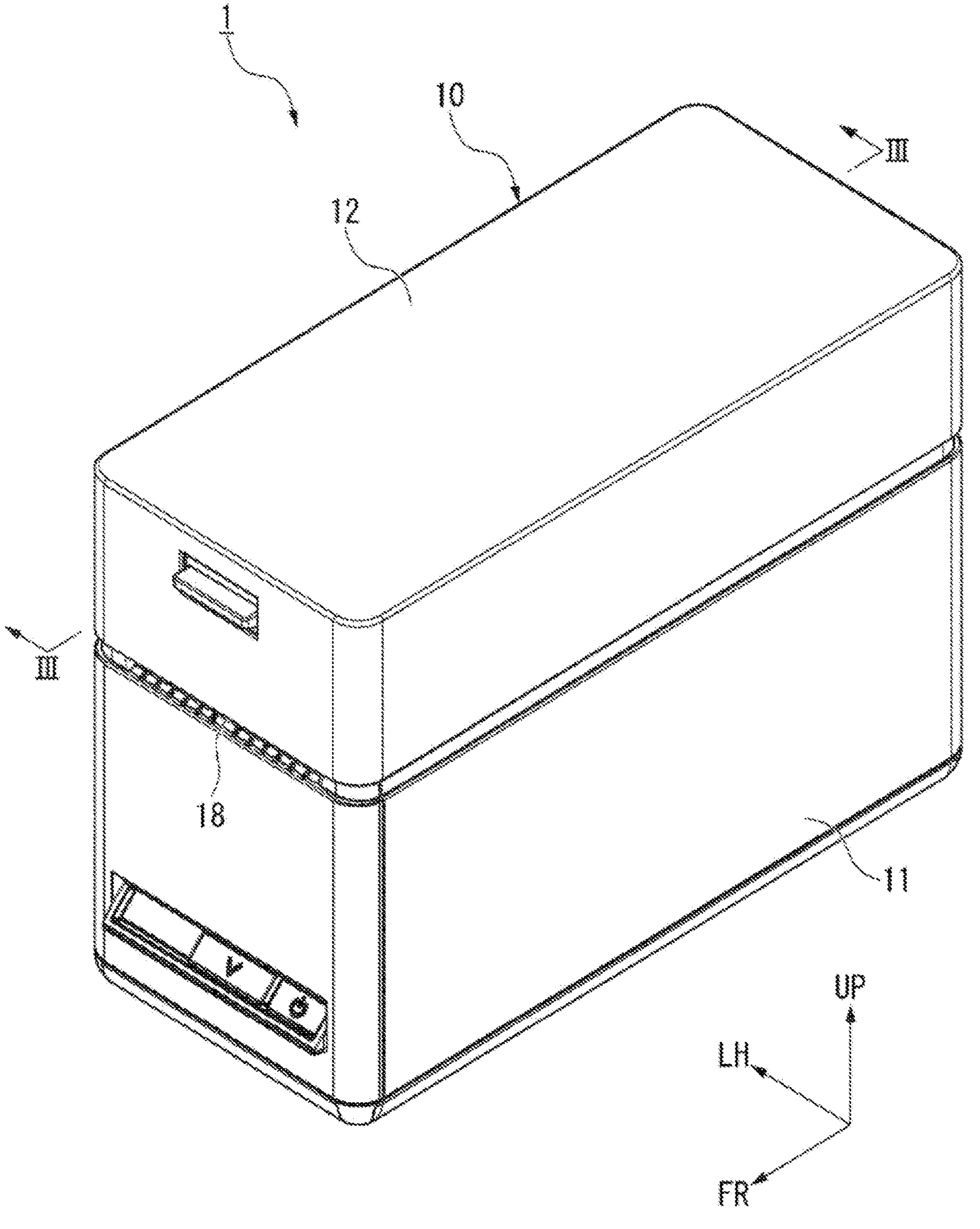
FIG. 1 is a perspective view for illustrating a printer according to an embodiment.
Figure 2:
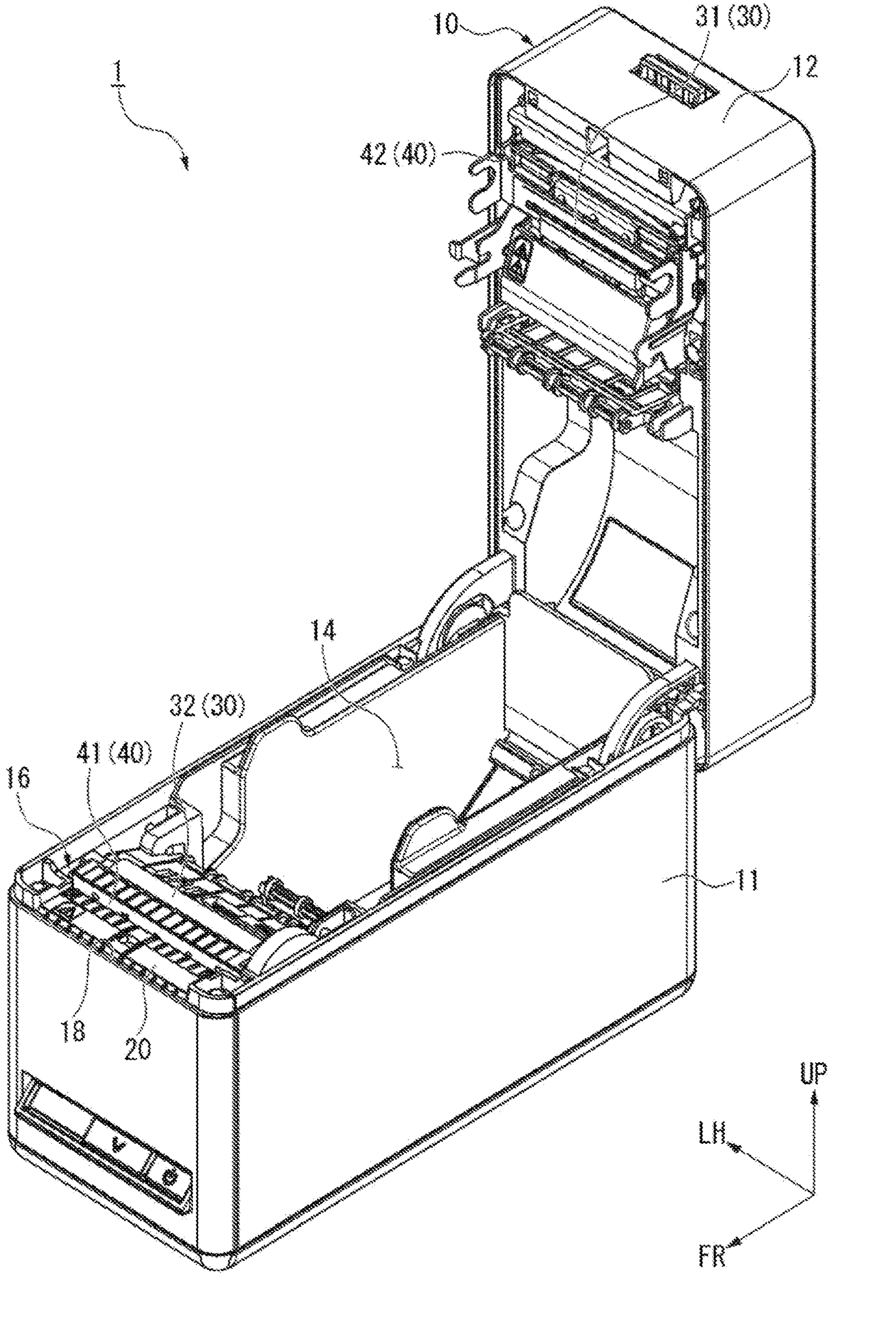
FIG. 2 is a perspective view for illustrating the printer according to the embodiment.

FIG. 1 and FIG. 2 are each a perspective view for illustrating a printer according to an embodiment. As illustrated in FIG. 1, a printer 1 is the printer 1 that performs printing on a linerless label having a pressure-sensitive adhesive surface on a back surface thereof. The linerless label does not have a liner that covers the pressure-sensitive adhesive surface. In this embodiment, the linerless label is made of paper, but a material of the linerless label is not limited to paper. For example, the linerless label may be made of a resin film. In the following description, the linerless label is simply referred to as a label L. The printer 1 includes a casing 10, a printing unit 30, a cutter unit 40, and a sensor 80. The printer 1 is placed on a placement surface G. In the following description of the casing 10 and the printing unit 30, a direction perpendicular to the placement surface G is referred to as an up-and-down direction (the arrow “UP” indicates an upper side), and two directions orthogonal to the up-and-down direction are referred to as a front-and-rear direction (the arrow “FR” indicates a front side) and a right-and-left direction (the arrow “LH” indicates a left side).

The casing 10 is formed into a rectangular parallelepiped shape. The casing 10 has a divided shape obtained by dividing the casing 10 into an upper part and a lower part, that is, an upper cover 12 and a case main body 11, respectively. The case main body 11 forms a lower half part of the casing 10. The case main body 11 is formed into a box shape opened upward, and is placed on the placement surface G.

The upper cover 12 forms an upper half part of the casing 10. A lower portion of a rear end of the upper cover 12 is pivotably coupled to an upper portion of a rear end of the case main body 11. The upper cover 12 is pivoted with respect to the case main body 11 about an axis extending in the right-and-left direction. The upper cover 12 is pivoted with respect to the case main body 11, to thereby open and close an opening of the case main body 11. The upper cover 12 is formed into a box shape opened downward. When the upper cover 12 is at a closing position, the upper cover 12 is superposed on the case main body 11 from above, and closes the opening of the case main body 11. When the upper cover 12 is at an opening position, the upper cover 12 retreats from an upper side of the case main body 11, and opens the opening of the case main body 11. Unless otherwise noted, description is made below of the printer 1 under a state in which the upper cover 12 closes the opening of the case main body 11.

The casing 10 includes a receiving portion 14, a sheet passing portion 16, and a delivery slot 18. The receiving portion 14 receives the label L before printing. The sheet passing portion 16 allows passage of the label L drawn out from the receiving portion 14. Through the delivery slot 18, the label L printed by the printing unit 30 is delivered to an outside of the casing 10.

The receiving portion 14 receives the label L wound into a roll shape. The receiving portion 14 is formed in the case main body 11 as a recessed portion opened upward, and is closed by the upper cover 12. The receiving portion 14 is formed in a rear portion of the casing 10. The receiving portion 14 receives the label L having a roll shape under a state in which a winding axis of the label L extends along the right-and-left direction. The label L is drawn out from the receiving portion 14 under a state in which a print surface of the label L faces upward and a pressure-sensitive adhesive surface of the label L faces downward. In this embodiment, the receiving portion 14 is formed so as to be capable of receiving therein a plurality of kinds of labels L having different sheet widths. Irrespective of the sheet width of the received label L, the receiving portion 14 holds the label L such that a center of the label L in a width direction passes a center of the sheet passing portion 16 in the right-and-left direction.

The delivery slot 18 is defined between a front end of the case main body 11 and a front end of the upper cover 12. The delivery slot 18 allows communication between an inside and an outside of the casing 10. The delivery slot 18 is formed into a slit shape extending in the right-and-left direction. Through the delivery slot 18, the label L is delivered toward a front side of the printer. The sheet passing portion 16 extends to the front side from the receiving portion 14 toward the delivery slot 18. Details of the sheet passing portion 16 are described later.

In the following description of the printer 1, a direction of conveying the label L in the sheet passing portion 16 is referred to as a conveying direction. In the conveying direction, a side to which the label L is conveyed is referred to as a downstream side, and a side opposite to the downstream side is referred to as an upstream side. In this embodiment, the conveying direction substantially matches the front-and-rear direction. Further, the width direction of the strip-shaped label L located in the casing 10 matches the right-and-left direction. However, it is not always required that the conveying direction match the front-and-rear direction, and the conveying direction may be oblique to the front-and-rear direction.

Figure 3:
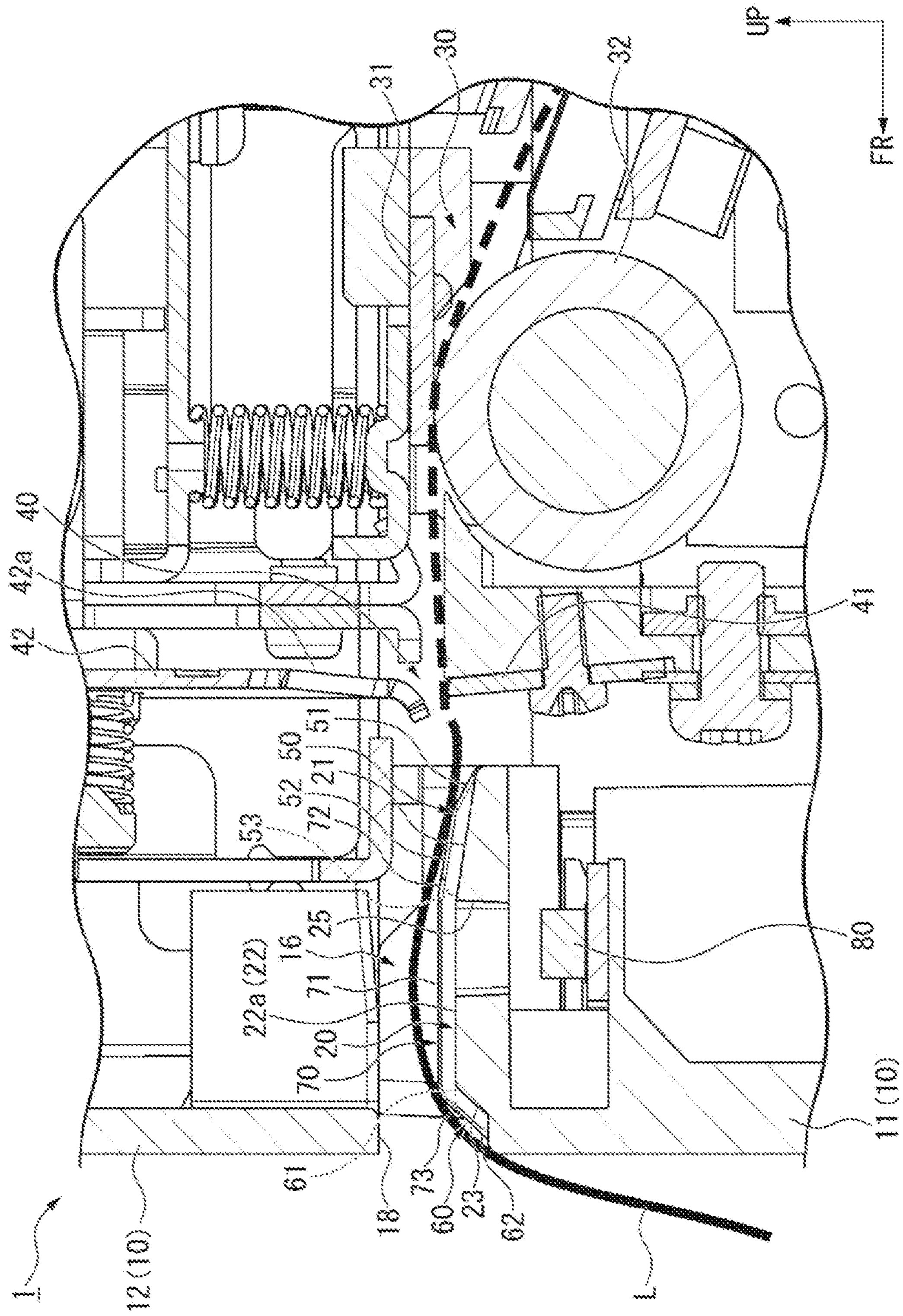
FIG. 3 is an enlarged sectional view for illustrating the printer according to the embodiment taken along the line III-III of FIG. 1.

FIG. 3 is an enlarged sectional view for illustrating the printer according to the embodiment taken along the line III-III of FIG. 1. As illustrated in FIG. 3, the printing unit 30 is arranged inside the casing 10. The printing unit 30 is arranged between the receiving portion 14 and the delivery slot 18 in the conveying direction. The printing unit 30 includes a thermal head 31 and a platen roller 32. The thermal head 31 performs printing on the label L. The platen roller 32 conveys the label L toward the delivery slot 18 while sandwiching the label L between the platen roller 32 and the thermal head 31.

The thermal head 31 is arranged in the upper cover 12. The thermal head 31 is fixed to a front end portion of the upper cover 12. The thermal head 31 includes a plurality of heating elements linearly arrayed along the right-and-left direction. The heating elements are opposed to the print surface of the label L located in the sheet passing portion 16 under a state in which the upper cover 12 closes the opening of the case main body 11.

The platen roller 32 is a rubber roller extending in the right-and-left direction. The platen roller 32 is arranged inside the case main body 11. The platen roller 32 is rotatable about the axis extending along the right-and-left direction, and is rotated in accordance with a driving force of a driving motor (not shown) during conveyance of the label L.

The platen roller 32 and the thermal head 31 are opposed to each other in the up-and-down direction through intermediation of the label L located in the sheet passing portion 16. The thermal head 31 is held in close contact with the platen roller 32 through intermediation of the label L. The label L is caused to pass between the platen roller 32 and the thermal head 31 along with rotation of the platen roller 32. A heating pattern of the heating elements of the thermal head 31 is controlled based on a signal output from a control board (not shown). Transfer of heat from the heating elements to a print surface L1 of the label L allows information (such as characters and figures) associated with the heating pattern to be printed on the print surface L1.

The cutter unit 40 is arranged between the printing unit 30 and the delivery slot 18 in the conveying direction. The cutter unit 40 is arranged at a distance from the delivery slot 18 in the conveying direction. The cutter unit 40 includes a fixed blade 41, a movable blade 42, and a moving mechanism (not shown). The cutter unit 40 causes the movable blade 42 to reciprocate with respect to the label L with the moving mechanism (not shown), and sandwiches the label L between the movable blade 42 and the fixed blade 41, to thereby form a cut in the label L. The cutter unit 40 leaves an uncut portion La (see FIG. 4) at a center portion of the label L in the width direction, that is, performs so-called partial cutting.

The fixed blade 41 is arranged in the case main body 11. The fixed blade 41 is opposed to the pressure-sensitive adhesive surface of the label L located in the sheet passing portion 16. The fixed blade 41 is formed into a plate-like shape extending in the right-and-left direction. The fixed blade 41 is fixed to the case main body 11.

The movable blade 42 is arranged in the upper cover 12. The movable blade 42 is opposed to the print surface L1 of the label L located in the sheet passing portion 16. The movable blade 42 is formed into a plate-like shape extending in the right-and-left direction. Further, the movable blade 42 is reciprocated by the moving mechanism (not shown) in the up-and-down direction. Along with downward movement, the movable blade 42 is brought close to the fixed blade 41, and a back concave surface 42*a* of the movable blade 42 facing the upstream side is brought into slide-contact with an upper edge of the fixed blade 41 from the downstream side. The movable blade 42 is moved downward while sandwiching the label L between the movable blade 42 and the fixed blade 41, thereby cutting the label L between the back concave surface 42*a* and the upper edge of the fixed blade 41.

Figure 4:
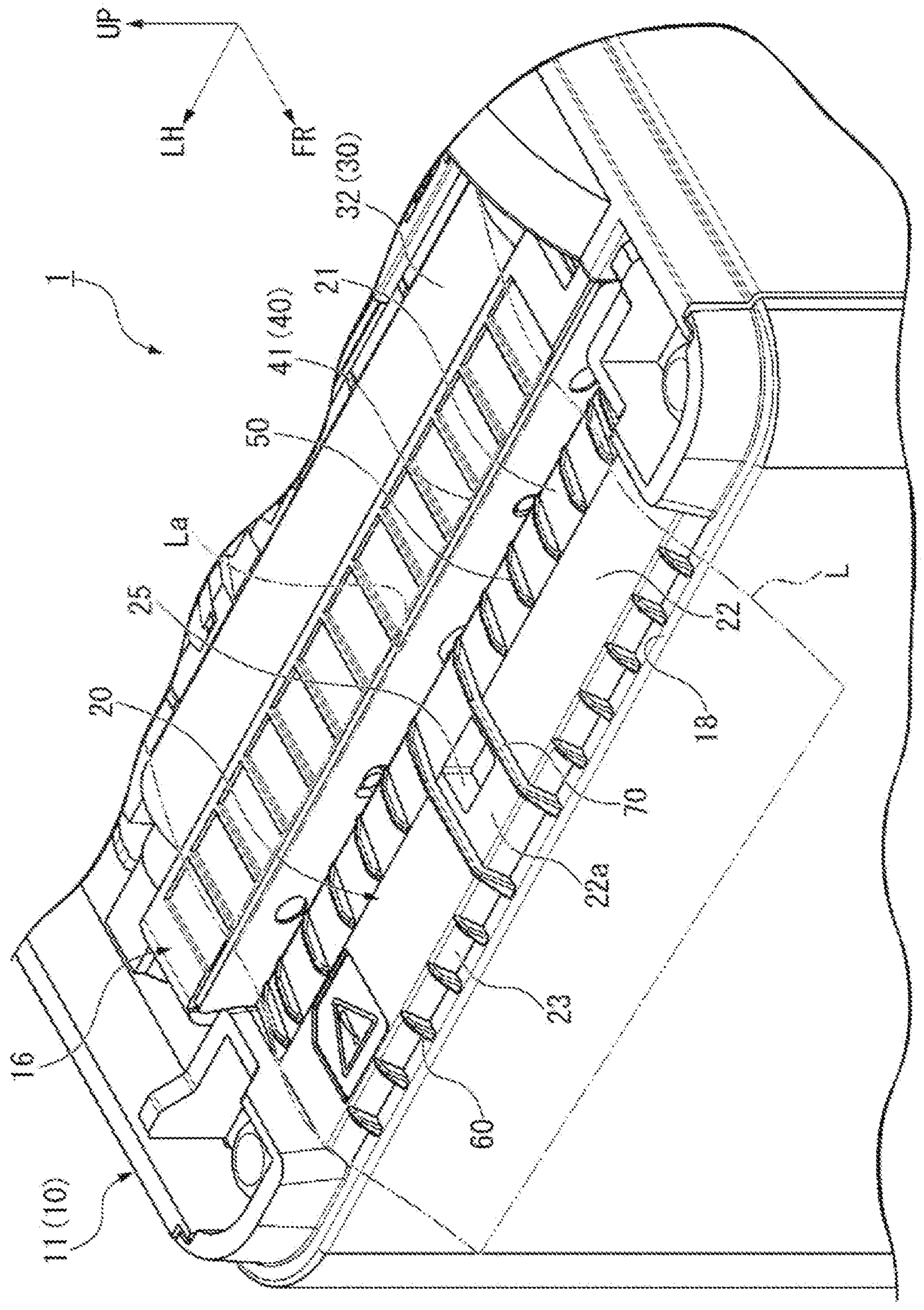
FIG. 4 is a perspective view for illustrating a sheet passing portion of the printer according to the embodiment.

Here, the sheet passing portion 16 is described. FIG. 4 is a perspective view for illustrating the sheet passing portion of the printer according to the embodiment. As illustrated in FIG. 3 and FIG. 4, the sheet passing portion 16 includes a guide surface 20 to be opposed to the pressure-sensitive adhesive surface of the label L. The guide surface 20 is provided between the cutter unit 40 and the delivery slot 18 in the conveying direction. The guide surface 20 is formed on the case main body 11. The guide surface 20 extends from a lower portion of an opening edge of the delivery slot 18 to the upstream side. The guide surface 20 includes an upstream portion 21, a downstream portion 23, and a midstream portion 22 that are divided in the conveying direction along boundary lines extending in the right-and-left direction.

The upstream portion 21 includes an upstream-side end portion of the guide surface 20. The upstream portion 21 extends from an upstream-side edge of the guide surface 20 to the delivery slot 18 side. The upstream portion 21 extends upward as extending from the rear side toward the front side. The upstream portion 21 is a flat surface. The upstream portion 21 is provided so as to overlap the fixed blade 41 in the front-and-rear direction. The upstream portion 21 and the fixed blade 41 define a gap in the front-and-rear direction therebetween, and the gap allows the movable blade 42 to move downward and enter between the upstream portion 21 and the fixed blade 41.

The midstream portion 22 is adjacent to the upstream portion 21 on the downstream side. The midstream portion 22 extends from a downstream-side edge of the upstream portion 21 to the delivery slot 18 side. The midstream portion 22 extends in parallel to the front-and-rear direction. The midstream portion 22 is a flat surface. A size of the midstream portion 22 in the front-and-rear direction is larger than a size of the upstream portion 21 in the front-and-rear direction. A sensor opening 25 is formed in the midstream portion 22. The sensor opening 25 is formed in a center portion 22*a* of the midstream portion 22 in the right-and-left direction. The center portion 22*a* in the right-and-left direction is, for example, a center region when the midstream portion 22 is equally divided into three regions in the right-and-left direction. In this embodiment, the sensor opening 25 is formed in a portion of the midstream portion 22 at an equal distance from each end of the midstream portion 22 in the right-and-left direction. The sensor opening 25 allows communication between an inside and an outside of the case main body 11 in the up-and-down direction.

The downstream portion 23 includes a downstream-side end portion of the guide surface 20. The downstream portion 23 is adjacent to the midstream portion 22 on the downstream side. The downstream portion 23 extends from a downstream-side edge of the midstream portion 22 to the delivery slot 18 side. The downstream portion 23 extends downward as extending from the rear side toward the front side. The downstream portion 23 is a flat surface. The downstream portion 23 extends at an inclination steeper than that of the upstream portion 21 with respect to the front-and-rear direction. A size of the downstream portion 23 in the front-and-rear direction is smaller than the size of the midstream portion 22 in the front-and-rear direction and the size of the upstream portion 21 in the front-and-rear direction.

Upstream ribs 50, downstream ribs 60, and midstream ribs 70 are formed upright on the guide surface 20. The upstream ribs 50, the downstream ribs 60, and the midstream ribs 70 have thicknesses in the right-and-left direction, and extend in the front-and-rear direction.

The upstream ribs 50 are formed upright on the upstream portion 21. A plurality of upstream ribs 50 are formed at intervals in the right-and-left direction. The upstream ribs 50 are arranged symmetrically with respect to the center of the guide surface 20 in the right-and-left direction. The upstream ribs 50 are formed over an entire region between both right and left ends of the guide surface 20.

The upstream ribs 50 are formed so as to match each other when seen from the right-and-left direction. Each of the upstream ribs 50 includes a rear edge 51, an upper edge 52, and a front edge 53. The rear edge 51 extends from an upstream-side edge of the upstream portion 21 to the downstream side. The rear edge 51 extends linearly to an upper front side of the printer from the upstream-side edge of the upstream portion 21 so as to be distant from the upstream portion 21 as extending toward the downstream side. The upper edge 52 extends from a downstream-side end portion of the rear edge 51 to the downstream side. The upper edge 52 extends linearly to the upper front side from the downstream-side end portion of the rear edge 51 in parallel to the upstream portion 21. The front edge 53 extends from a downstream-side end portion of the upper edge 52 to the downstream side. The front edge 53 extends linearly to a lower front side of the printer from the downstream-side end portion of the upper edge 52 so as to be close to the upstream portion 21 as extending toward the downstream side. The upper edge 52 is connected to the downstream-side edge of the upstream portion 21.

The downstream ribs 60 are formed upright on the downstream portion 23. A plurality of downstream ribs 60 are formed at intervals in the right-and-left direction. The downstream ribs 60 are arranged symmetrically with respect to the center of the guide surface 20 in the right-and-left direction. The downstream ribs 60 are arranged so as to overlap some of the upstream ribs 50 in a one-to-one relationship in the front-and-rear direction. In this embodiment, the number of the downstream ribs 60 is smaller than the number of the upstream ribs 50 by two, and the downstream ribs 60 are arranged so as to overlap, in the one-to-one relationship in the front-and-rear direction, the upstream ribs 50 excluding the upstream ribs 50 located at each end in the right-and-left direction among the plurality of upstream ribs 50. That is, the downstream ribs 60 are formed in a region in the right-and-left direction inside both right and left ends of the guide surface 20. However, similarly to the upstream ribs 50, the downstream ribs 60 may be formed over the entire region between the both right and left ends of the guide surface 20.

The downstream ribs 60 are formed so as to match each other when seen from the right-and-left direction. Each of the downstream ribs 60 includes an upper edge 61 and a front edge 62. The upper edge 61 extends from an upstream-side edge of the downstream portion 23 to the downstream side. The upper edge 61 extends linearly to a front side of the printer from the upstream-side edge of the downstream portion 23 so as to be distant from the downstream portion 23 as extending toward the downstream side. The upper edge 61 is formed such that the downstream rib 60 is prevented from protruding more to the upper side than a tangent line of the midstream portion 22 when seen from the right-and-left direction. In this embodiment, the upper edge 61 extends from the downstream-side edge of the midstream portion 22 in parallel to the midstream portion 22. However, the upper edge 61 may extend from the downstream-side edge of the midstream portion 22 to the lower front side obliquely to the midstream portion 22 such that the downstream rib 60 is prevented from protruding more to the upper side than the tangent line of the midstream portion 22 when seen from the right-and-left direction. The front edge 62 extends from the downstream-side end portion of the upper edge 61 to the downstream side. The front edge 62 extends linearly to the lower front side from the downstream-side end portion of the upper edge 61 in parallel to the downstream portion 23. The front edge 62 is connected to the opening edge of the delivery slot 18.

The midstream ribs 70 are formed upright on the midstream portion 22. A pair of midstream ribs 70 are formed at intervals in the right-and-left direction. The midstream ribs 70 are arranged symmetrically with respect to the center of the guide surface 20 in the right-and-left direction. All the midstream ribs 70 are formed only in a region inside both ends in the right-and-left direction of a range in which the upstream ribs 50 are formed, and inside both ends in the right-and-left direction of a range in which the downstream ribs 60 are formed. In this embodiment, all the midstream ribs 70 are formed only in the center portion **22*a* of the midstream portion 22 in the right-and-left direction. The pair of midstream ribs 70 are arranged on both sides in the right-and-left direction across the sensor opening 25. An interval between the pair of midstream ribs 70 is equal to or smaller than a double of a width of the sensor opening 25 in the right-and-left direction. The interval between the pair of midstream ribs 70 is smaller than a size of the midstream portion 22 in the front-and-rear direction. The midstream ribs 70 are respectively connected in a one-to-one relationship to two upstream ribs 50 located closer to the center in the right-and-left direction among the upstream ribs 50, and are respectively connected in a one-to-one relationship to two downstream ribs 60 located closer to the center in the right-and-left direction among the downstream ribs 60**.

The midstream ribs 70 are formed so as to match each other when seen from the right-and-left direction. Each of the midstream ribs 70 includes an upper edge 71, a rear edge 72, and a front edge 73. The upper edge 71 extends from a position above an upstream-side end portion of the midstream portion 22 to a position above a downstream-side end portion of the midstream portion 22. The upper edge 71 extends linearly in parallel to the midstream portion 22. The rear edge 72 extends from an upstream-side end portion of the upper edge 71 to the upstream side, and is connected to the upstream rib 50. The rear edge 72 is connected to the downstream-side end portion of the upper edge 52 of the upstream rib 50. The rear edge 72 extends in parallel to the upper edge 52 of the upstream rib 50, and is formed so as to extend continuously from the upper edge 52 of the upstream rib 50. With this configuration, the rear edge 72 of the midstream rib 70 is connected to the upper edge 52 of the upstream rib 50 without a level difference when seen from the right-and-left direction. The front edge 73 extends from a downstream-side end portion of the upper edge 71 to the downstream side, and is connected to the downstream rib 60. The front edge 73 is connected to an upstream-side end portion of the front edge 62 of the downstream rib 60. The front edge 73 extends in parallel to the front edge 62 of the downstream rib 60, and is formed so as to extend continuously from the front edge 62 of the downstream rib 60. With this configuration, the front edge 73 of the midstream rib 70 is connected to the front edge 62 of the downstream rib 60 without a level difference when seen from the right-and-left direction.

The sensor 80 is fixed to the case main body 11. The sensor 80 detects the label L located between the printing unit 30 and the delivery slot 18 in the sheet passing portion 16. The sensor 80 is arranged below the guide surface 20. The sensor 80 is arranged at the same position as that of the midstream portion 22 of the guide surface 20 in the conveying direction. The sensor 80 detects the label L through the sensor opening 25. The sensor 80 detects the center portion of the label L in the width direction.

As illustrated in FIG. 3, the label L is brought into contact with the upstream ribs 50 that are located on the downstream side of the cutter unit 40 and in front of the upper edge of the fixed blade 41. The label L hangs down due to gravity outside the delivery slot 18 using the lower portion of the opening edge of the delivery slot 18 as a fulcrum, and thus extends upward inside the delivery slot 18 as extending toward the upstream side. Inside the delivery slot 18, the label L is brought into contact with vicinities of the downstream-side end portions of the midstream ribs 70. Inside the delivery slot 18, the label L may be brought into contact with the downstream ribs 60. Under a state in which the label L thus extends upward inside the delivery slot 18 as extending toward the upstream side, the label L is brought into contact with the upstream ribs 50 and the vicinities of the downstream-side end portions of the midstream ribs 70, thereby exhibiting an upward protruding shape when seen from the right-and-left direction in a space above the midstream portion 22 of the guide surface 20.

Figure 5:
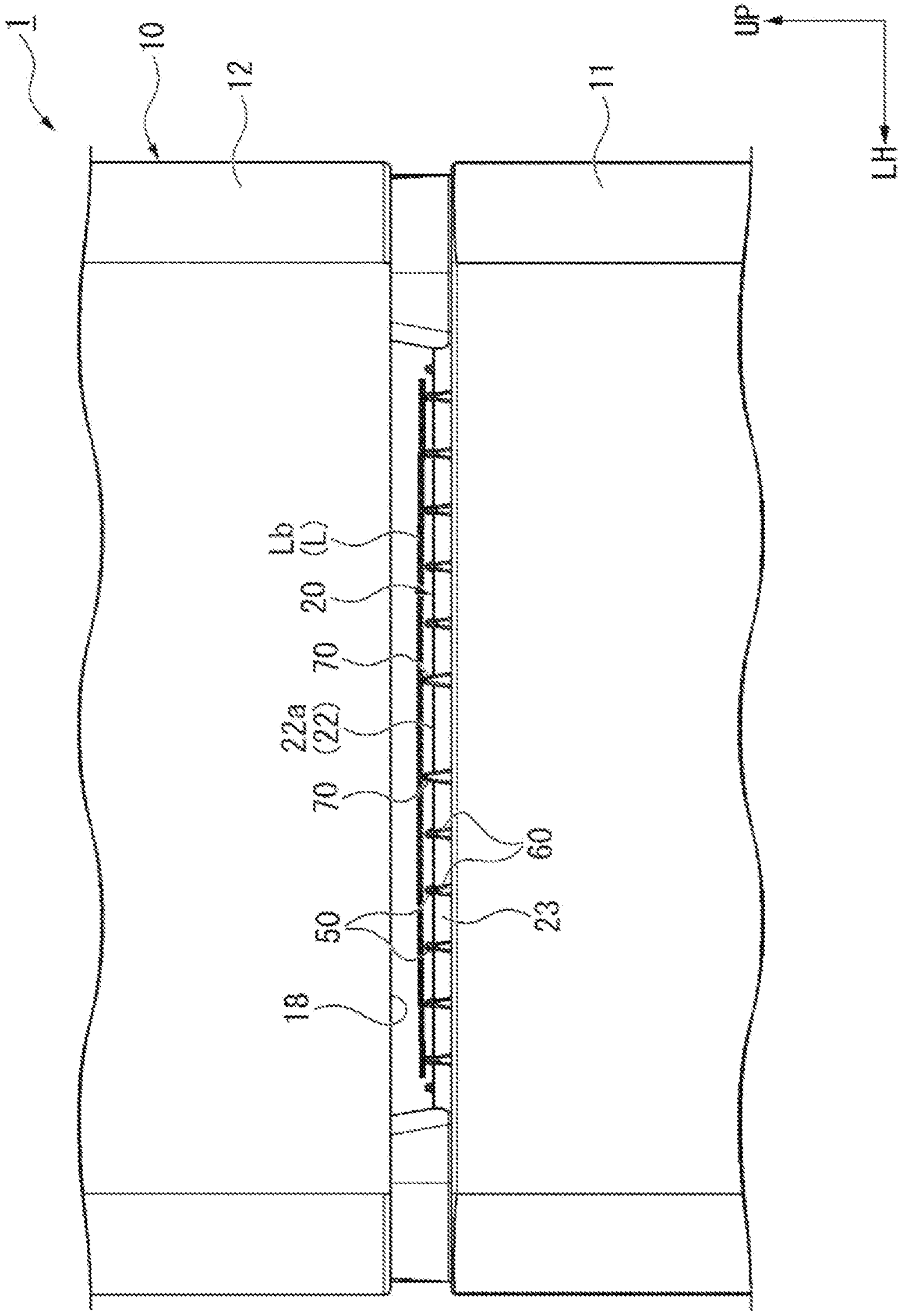
FIG. 5 is a front view for illustrating a periphery of a delivery slot of the printer according to the embodiment.

FIG. 5 is a front view for illustrating a periphery of the delivery slot of the printer according to the embodiment. As illustrated in FIG. 5, when a leading edge Lb of the label L passes through the space above the midstream portion 22 of the guide surface 20, the label L sometimes hangs down using its contact portion with the upstream ribs 50 as a fulcrum. In this case, the leading edge Lb of the label L is brought into contact with the midstream ribs 70, and thus a leading edge portion of the label L is inhibited from hanging down. Thus, the label L is inhibited from coming into contact with the guide surface 20 (in particular, midstream portion 22).

As described above, in this embodiment, the casing 10 includes the guide surface 20 to be opposed to the pressure-sensitive adhesive surface of the label L that has passed through the printing unit 30. The guide surface 20 includes: the upstream portion 21, which includes the plurality of upstream ribs 50 formed upright at intervals in the right-and-left direction to extend along the conveying direction; the downstream portion 23, which is provided at a distance from the upstream portion 21 on the downstream side in the conveying direction, and includes the plurality of downstream ribs 60 formed upright at intervals in the right-and-left direction to extend along the conveying direction; and the midstream portion 22, which is provided at the same position as that of the sensor 80 in the conveying direction, is located between the upstream portion 21 and the downstream portion 23, and includes the midstream ribs 70 formed upright only on the center portion **22*a*** in the right-and-left direction.

With this configuration, in order to ensure a space for arranging the sensor 80, the midstream portion 22 of the guide surface 20 is formed to have a large size in the conveying direction. Accordingly, when the label L passes through a position opposed to the midstream portion 22, even though the pressure-sensitive adhesive surface of the label L is liable to stick to the midstream portion 22, the midstream ribs 70 can inhibit the pressure-sensitive adhesive surface of the label L from sticking to the midstream portion 22. Thus, the pressure-sensitive adhesive surface of the label L can be prevented from coming into contact with and sticking to unintended places. Consequently, the printer capable of preventing sticking of the label L inside the delivery slot 18 can be provided.

In addition, the midstream ribs 70 are formed only on the center portion **22*a* of the midstream portion 22 in the right-and-left direction, and hence can prevent only one side portion of the label L in the right-and-left direction from sticking to the midstream ribs 70 and causing meandering of the label L. Accordingly, a paper jam of the label L can be prevented from occurring inside the delivery slot 18**.

The center portion **22*a* of the midstream portion 22 is located in the region in the right-and-left direction inside both ends of a range in which the plurality of upstream ribs 50 are formed and inside both ends of a range in which the plurality of downstream ribs 60 are formed. With this configuration, on both sides in the conveying direction across the midstream portion 22, the upstream ribs 50 and the downstream ribs 60 are provided in a wider region in the right-and-left direction than the region in which the midstream ribs 70 are provided. Thus, even when the midstream ribs 70 are not provided in the right-and-left direction over a range equivalent to or wider than the range in which the upstream ribs 50 and the downstream ribs 60 are provided, the label L can be guided along a desired path through a space that the guide surface 20** faces. Accordingly, the pressure-sensitive adhesive surface of the label L can be more reliably prevented from coming into contact with and sticking to unintended places.

The sensor opening 25 facing the sensor 80 is formed in the midstream portion 22. With this configuration, the sensor opening 25 is formed in the midstream portion 22 of the guide surface 20, and hence the midstream portion 22 is formed to have a large size in the conveying direction, thereby being capable of providing an optimum configuration that achieves the actions and effects described above.

The pair of midstream ribs 70 are arranged on both sides in the right-and-left direction across the sensor 80. With this configuration, the pair of midstream ribs 70 can inhibit the label L from sticking to the midstream portion 22 of the guide surface 20 at a detection position of the sensor 80. Accordingly, the label L is prevented from sticking to the guide surface 20 and being out of the detection position of the sensor 80, thereby being capable of accurately detecting the presence or absence of the label L by the sensor 80.

The downstream ribs 60 do not protrude from the tangent line of the midstream portion 22 when seen from the right-and-left direction. With this configuration, even when the leading edge of the label L is brought into slide-contact with a region of the midstream portion 22 of the guide surface 20 in the right-and-left direction in which no midstream rib 70 is provided, the leading edge of the label L can be prevented from being caught on the downstream ribs 60. Thus, the pressure-sensitive adhesive surface of the label L can be prevented from coming into contact with and sticking to unintended places.

The receiving portion 14 receives the label L wound into a roll shape. With this configuration, the label L having a long length passes through the space that the guide surface 20 faces, thereby being capable of providing the printer 1 suitable for attaining the actions and effects described above in order to achieve stable delivery of the label L.

The present invention is not limited to the embodiment described above with reference to the drawings, and various modifications may be made thereto within the technical scope of the present invention. For example, in the embodiment described above, a pair of midstream ribs 70 are provided. However, only one midstream rib may be provided, or three or more midstream ribs may be provided.

In the embodiment described above, the midstream rib 70 is connected to the upstream rib 50 and the downstream rib 60, but the midstream rib may be not connected to at least any one of the upstream rib 50 and the downstream rib 60. However, it is desired that the midstream rib extend such that the edge of the midstream rib extends continuously from the edge of the upstream rib and the edge of the downstream rib when seen from the right-and-left direction. For example, the midstream rib may be not connected to the upstream rib. In that case, it is desired that, when the midstream rib and the upstream rib, which is arranged to be shifted from the midstream rib in the right-and-left direction, are seen from the right-and-left direction, the midstream rib have the edge extending continuously from the edge of the upstream rib. Thus, after the leading edge of the label is brought into slide-contact with and moved onto the edges of the plurality of upstream ribs, the leading edge of the label can be smoothly moved onto the edges of the midstream ribs, thereby being capable of preventing the label from being caught on the midstream ribs. The same holds true for a configuration in which the midstream rib is not connected to the downstream rib.

Besides the above, the components in the above-mentioned embodiment may be replaced by well-known components as appropriate without departing from the gist of the present invention.

What is claimed is:

1. A printer configured to perform printing on a linerless label including a pressure-sensitive adhesive surface formed on a back surface of the linerless label, the printer comprising:

a casing including:

a receiving portion configured to receive the linerless label before printing; and a delivery slot through which the printed linerless label is delivered;

a printing unit including:

a thermal head, which is arranged inside the casing, and is configured to perform printing on the linerless label; and a platen roller, which extends in a width direction of the linerless label, and is configured to convey the linerless label toward the delivery slot while sandwiching the linerless label between the platen roller and the thermal head; and a sensor configured to detect the linerless label located between the printing unit and the delivery slot, wherein the casing includes a guide surface to be opposed to the pressure-sensitive adhesive surface of the linerless label that has passed through the printing unit, wherein the guide surface includes:

an upstream portion, which includes a plurality of upstream ribs formed upright at intervals in the width direction to extend along a conveying direction of the linerless label;

a downstream portion, which is provided at a distance from the upstream portion on a downstream side in the conveying direction, and includes a plurality of downstream ribs formed upright at intervals in the width direction to extend along the conveying direction; and a midstream portion, which is provided at the same position as that of the sensor in the conveying direction, is located between the upstream portion and the downstream portion, and includes at least one midstream rib formed upright only on a center portion of the midstream portion in the width direction to extend along the conveying direction.

2. The printer according to claim 1, wherein the center portion is provided in a region in the width direction inside both ends of a range in which the plurality of upstream ribs are formed and inside both ends of a range in which the plurality of downstream ribs are formed.

3. The printer according to claim 1, wherein an opening is formed in the midstream portion, and wherein the sensor detects the linerless label through the opening.

4. The printer according to claim 1, wherein the at least one midstream rib includes a pair of midstream ribs arranged on both sides in the width direction across the sensor.

5. The printer according to claim 1, wherein the downstream ribs are prevented from protruding from a tangent line of the midstream portion when seen from the width direction.

6. The printer according to claim 1, wherein the receiving portion receives the linerless label wound into a roll shape.

* * * * *